(12) United States Patent
Varma et al.

(10) Patent No.: US 9,494,996 B2
(45) Date of Patent: Nov. 15, 2016

(54) PROCESSOR HAVING FREQUENCY OF OPERATION INFORMATION FOR GUARANTEED OPERATION UNDER HIGH TEMPERATURE EVENTS

(71) Applicant: Intel Corporation, Santa Clara, CA (US)

(72) Inventors: Ankush Varma, Hillsboro, OR (US);
Robin A. Steinbrecher, Olympia, WA (US); Susan F. Smith, Olympia, WA (US); Sandeep Ahuja, University Place, WA (US); Vivek Garg, Folsom, CA (US); Tessil Thomas, Bangalore (IN); Krishnakanth V. Sistla, Beaverton, OR (US); Chris Poirier, Fort Collins, CO (US); Martin Mark T. Rowland, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 250 days.

(21) Appl. No.: 13/843,855

(22) Filed: Mar. 15, 2013

(65) Prior Publication Data

US 2014/0281445 A1    Sep. 18, 2014

(51) Int. Cl.
*G06F 1/32* (2006.01)
*G06F 1/00* (2006.01)
*G06F 1/20* (2006.01)

(52) U.S. Cl.
CPC ............. *G06F 1/3234* (2013.01); *G06F 1/206* (2013.01); *G06F 1/3203* (2013.01); *G06F 1/324* (2013.01); *G06F 1/3287* (2013.01); *G06F 1/20* (2013.01); *Y02B 60/1217* (2013.01)

(58) Field of Classification Search
CPC ...... G06F 1/3203; G06F 1/3287; G06F 1/20; Y02B 60/1217
See application file for complete search history.

(56) References Cited

U.S. PATENT DOCUMENTS

| 5,109,503 | A | 4/1992 | Cruickshank et al. |
| 5,606,710 | A | 2/1997 | Hall et al. |
| 5,781,793 | A | 7/1998 | Larvoire et al. |
| 6,510,400 | B1 | 1/2003 | Moriyama |
| 6,711,526 | B2 | 3/2004 | Cooper |
| 6,823,516 | B1 | 11/2004 | Cooper |
| 7,174,471 | B2 | 2/2007 | Komarla et al. |

(Continued)

FOREIGN PATENT DOCUMENTS

| CN | 101030095 A | 9/2007 |
| CN | 101241392 A | 8/2008 |

(Continued)

OTHER PUBLICATIONS

Intel Xeon Processor 7500 Series Uncore Programming Guide, Intel Corporation. Reference No. 323535-001 Mar. 2010, pp. 1-146.

(Continued)

*Primary Examiner* — Mohammed Rehman
*Assistant Examiner* — Gayathri Sampath
(74) *Attorney, Agent, or Firm* — Nicholson De Vos Webster & Elliott, LLP

(57) ABSTRACT

A processor is described having a semiconductor chip having non volatile storage circuitry. The non volatile storage circuitry has information identifying a maximum operational frequency of the processor at which the processor's operation is guaranteed for an ambient temperature that corresponds to an extreme thermal event.

22 Claims, 5 Drawing Sheets

(56) References Cited

U.S. PATENT DOCUMENTS

| | | | |
|---|---|---|---|
| 7,400,167 | B2 | 7/2008 | Lewis et al. |
| 7,610,497 | B2 | 10/2009 | Lin et al. |
| 8,060,766 | B2 | 11/2011 | Konstadinidis et al. |
| 8,103,975 | B2 | 1/2012 | Lewis et al. |
| 8,301,742 | B2 | 10/2012 | Hanson et al. |
| 9,037,840 | B2 | 5/2015 | Varma et al. |
| 2002/0087287 | A1* | 7/2002 | Dai ................................. 702/132 |
| 2002/0087897 | A1 | 7/2002 | Cline et al. |
| 2002/0087904 | A1* | 7/2002 | Cai ........................ G06F 1/206 713/322 |
| 2003/0097603 | A1* | 5/2003 | Athas ..................... G06F 1/206 713/500 |
| 2003/0110423 | A1* | 6/2003 | Helms ..................... G06F 1/206 714/100 |
| 2005/0071705 | A1* | 3/2005 | Bruno et al. .................. 713/500 |
| 2006/0161375 | A1 | 7/2006 | Duberstein et al. |
| 2006/0167657 | A1* | 7/2006 | Naffziger et al. ............. 702/182 |
| 2007/0079154 | A1* | 4/2007 | Diefenbaugh ........ G06F 1/3203 713/300 |
| 2007/0118774 | A1* | 5/2007 | Thomas et al. ............... 713/300 |
| 2007/0186128 | A1* | 8/2007 | Rambo et al. .................. 714/47 |
| 2007/0255972 | A1 | 11/2007 | Gaskins et al. |
| 2011/0035611 | A1 | 2/2011 | Brey et al. |
| 2011/0252251 | A1 | 10/2011 | De Cesare et al. |
| 2012/0060170 | A1* | 3/2012 | Vajda ..................... G06F 9/4893 718/104 |
| 2012/0110352 | A1 | 5/2012 | Branover et al. |
| 2012/0159201 | A1 | 6/2012 | Distefano et al. |
| 2013/0061064 | A1 | 3/2013 | Ananthakrishnan et al. |
| 2013/0283019 | A1 | 10/2013 | Ould-Ahmed-Vall et al. |
| 2015/0241949 | A1 | 8/2015 | Varma et al. |

FOREIGN PATENT DOCUMENTS

| | | |
|---|---|---|
| CN | 101281415 A | 10/2008 |
| CN | 101334688 A | 12/2008 |
| EP | 0712064 | 5/1998 |
| EP | 2234326 A2 | 9/2010 |
| JP | 2000-284862 A | 10/2000 |
| JP | 2003-186566 A | 7/2003 |
| JP | 2009-510618 A1 | 3/2009 |
| JP | 2009-230670 A | 10/2009 |
| JP | 2012-074064 A | 4/2012 |
| KR | 10-2001-0100624 A | 11/2001 |
| WO | 2007/024403 A2 | 3/2007 |

OTHER PUBLICATIONS

Xu, Min, et al, A Hardware Memory Race Recorder for Deterministic Replay, Published by the IEEE Computer Society, Jan.-Feb. 2007, pp. 48-55.

Office Action from counterpart Great Britain Patent Application No. GB1404613.0, mailed Aug. 1, 2014, 7 Pages.

Office action with English translation from corresponding Japanese Patent Application No. 2014-042673, mailed Feb. 24, 2015, 3 pages.

Office action with English translation from corresponding Korean Patent Application No. 10-2014-31257, mailed Apr. 1, 2015, 13 pages.

PCT/US2013/047620 Notification of Transmittal of the International Search Report and the Written Opinion of the International Searching Authority, mailed Oct. 10, 2013, 13 pages.

PCT/US2013/047620 Notification Concerning Transmittal of International Preliminary Report on Patentability, mailed Jan. 8, 2015, 10 pages.

Office action from U.S. Appl. No. 13/538,546, mailed Jun. 2, 2014, 15 pages.

Notice of Allowance from U.S. Appl. No. 13/538,546, mailed Sep. 29, 2014, 5 pages.

Notice of Allowance from U.S. Appl. No. 13/538,546, mailed Jan. 12, 2015, 5 pages.

Office action with English translation from German Patent Application No. 102014003666.9, mailed Dec. 3, 2015, 9 pages.

Office action with English translation from Japanese Patent Application No. 2014-042673, mailed Oct. 20, 2015, 4 pages.

Notice of Allowance from Korean Patent Application No. 10-2014-0031257, mailed Sep. 15, 2015, 3 pages.

Office action from U.S. Appl. No. 14/697,541, mailed Oct. 20, 2015, 5 pages.

Notification of Grant from Great Britain Patent Application No. GB1404613.0, mailed Jun. 21, 2016, 2 pages.

Decision to Grant a Patent with English translation from Japanese Patent Application No. 2014-042673, mailed Feb. 3, 2016, 4 pages.

Office action with English translation from Chinese Patent Application No. 201410095710.7, mailed Mar. 1, 2016, 28 pages.

Notice of Allowance from U.S. Appl. No. 14/697,541, mailed Apr. 12, 2016, 5 pages.

\* cited by examiner

PROCESSOR HAVING FREQUENCY OF OPERATION INFORMATION FOR GUARANTEED OPERATION UNDER HIGH TEMPERATURE EVENTS

FIELD OF INVENTION

The field of invention pertains generally to computing systems and more specifically to a processor having maximum temperature information for guaranteed operation.

BACKGROUND

As the power consumption of computing systems has become a matter of concern, most present day systems include sophisticated power management functions. A common framework is to define both "performance" states and "power" states for a computer system's processor (which may include multiple processing cores). A processor's performance is its ability to do work over a set time period. The higher a processor's performance the more work it can do over the set time period. As such, a processor's power consumption increases as its performance increases.

A processor's performance can be adjusted during runtime by changing its internal clock speeds and voltage levels. Thus, a processor's different performance states correspond to different clock settings and internal voltage settings so as to effect a different performance vs. power consumption tradeoff. According to the Advanced Configuration and Power Interface (ACPI) standard the different performance states are labeled with different "P numbers": P0, P1, P2 . . . P_R, where, P0 represents the highest performance and power consumption state and P_R represents the lowest level of power consumption that a processor is able to perform work at. The term "R" in "P_R" represents the fact that different processors may be configured to have different numbers of performance states.

In contrast to performance states, power states are largely directed to defining different "sleep modes" of a processor. According to the ACPI standard, the C0 state is the only power state at which the processor can do work. As such, for the processor to enter any of the performance states (P0 through P_R), the processor must be in the C0 power state. When no work is to be done and the processor is to be put to sleep, the processor can be put into any of a number of different power states C1, C2 . . . C_S where each power state represents a different level of sleep and, correspondingly, a different amount of time needed to transition back to the operable C0 power state. Here, a different level of sleep means different power savings while the processor is sleeping.

A deeper level of sleep therefore corresponds to slower internal clock frequencies and/or lower internal supply voltages and/or more blocks of logic that receive a slower clock frequency and/or a lower supply voltage. Increasing C number corresponds to a deeper level of sleep. Therefore, for instance, a processor in the C2 power state might have lower internal supply voltages and more blocks of logic that are turned off than a processor in the C1 state. Because deeper power states corresponds to greater frequency and/or voltage swings and/or greater numbers of logic blocks that need to be turned on to return to the C0 state, deeper power states also take longer amounts of time to return to the C0 state.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
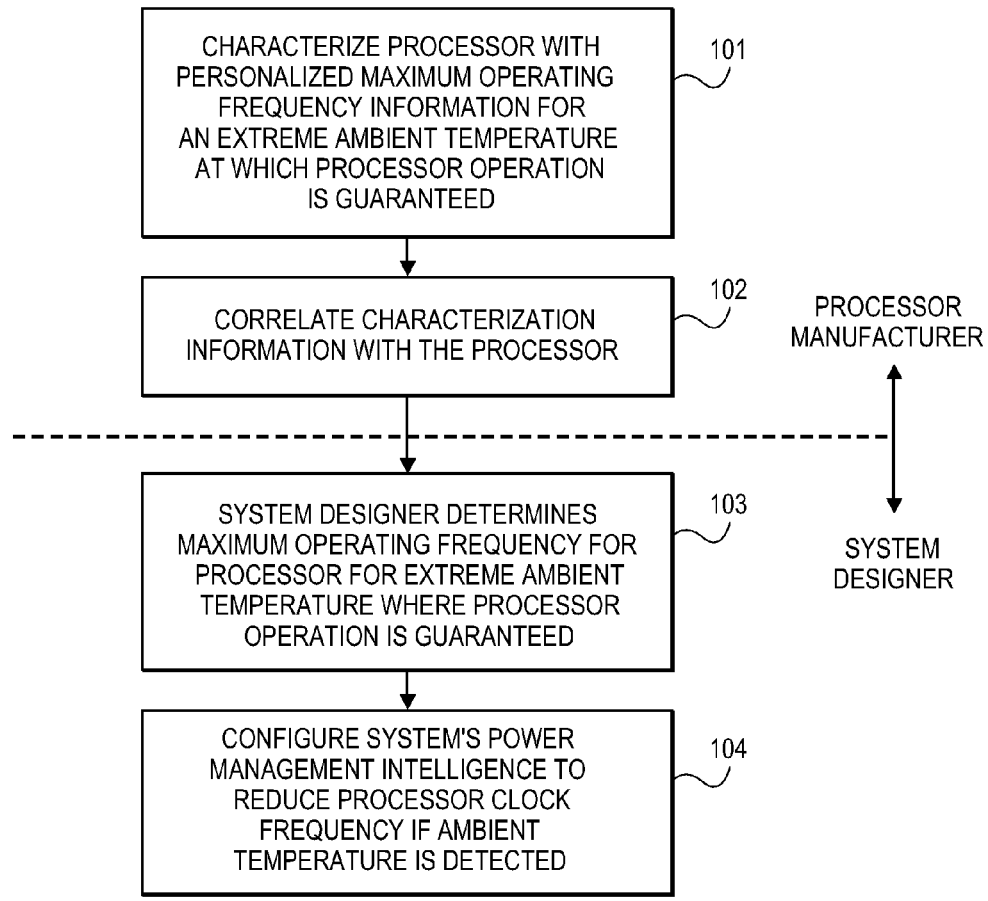
FIG. 1 shows a process that characterizes a processor.

System designers are currently having trouble resolving a tradeoff between "guaranteed" processor performance and thermal system cost. Specifically, over the course of the lifetime of a computing system, unlikely yet nevertheless possible extreme ambient temperature events may be presented to the system's processor(s). For example, a cooling fan may fail on an unusually hot day, or, the system may be operated in a desert without air conditioning. System designers are currently faced with a quandary designing a cooling system for such possibilities. A cooling system that is able to keep the processor "cool enough" under such circumstances will be too expensive given the reality that the number of systems that will experience such circumstances will be few and far between and/or such periods of extreme temperature will be brief if experienced.

Complicating the problem is the notion of guaranteed processor operation, particularly under extreme thermal conditions (such as the sudden breakdown of a fan). Currently, processor manufacturers provide maximum rated supply voltage, operating frequency and temperature specifications. Here, "guaranteed operation" means that the processor is not expected to incur unacceptable operational errors. However, these ratings have some margin in them and/or are somewhat conservative. As such, at least some shipped parts may be able to properly operate beyond such ratings. The "true" maximum ratings for a specific processor, where that processor's operation is guaranteed, is simply unknown to the system designer.

Accordingly, at least some system designers may wish to entertain the idea of only building a nominal cooling system (to keep cooling system costs down) but enhance the power management control of the processor so as to drop the performance state of the processor in response to an extreme thermal event, where, the processor's operation remains guaranteed at the reduced state. Here, to the extent some margin may exist between what the part is formally rated for versus the operating conditions the part may actually be able to withstand for at least a limited amount of time, e.g., in the case of a sudden thermal event, it may be permissible to run the part beyond its formal ratings yet still provide guaranteed operation.

As a matter of physics, a processor's operation can be guaranteed as a function of its die temperature. Here, operational failure mechanisms are understood to be largely related to changes within the semiconductor chip's physical composition that arise when the chip becomes too hot. The temperature of the processor die is a function of the die's power consumption, the die's packaging, the cooling system applied to the packaging and the ambient temperature. The power consumption of the processor die (which largely corresponds to the "performance" of the die) is the current drawn by the die multiplied by its supply voltage. The current drawn by the die at a specific supply voltage is a function of the clock frequency and workload of the processor die.

Thus, when a specific supply voltage, clock frequency and workload are applied to the die, the temperature of the die will rise to some level that is lessened as the cooling system becomes more advanced and the ambient temperature decreases. Said another way, if a specific supply voltage, clock frequency and workload are applied to the die and no cooling of any kind is applied to the die's package, the temperature of the die will rise to some level that is dictated by the physics of the die, its packaging without cooling and the ambient temperature. As more advanced/capable cooling is applied to the die's packaging and/or as the ambient temperature decreases, the temperature of the die will only reach lower and lower levels for the same applied supply voltage, clock frequency and workload.

It would be useful therefore for a processor manufacturer to provide one or more operational frequencies with each processor that can be applied to the processor under extreme thermal conditions where the processor's performance remains guaranteed. Conceivably such operational frequencies may cause the processor to exceed its formal maximum ratings. In an embodiment, these special operational frequencies are understood to be applied only temporarily (e.g., a few hours or days) if they correspond to operation beyond the processor's nominal maximum ratings. In practice then, system designers design their power management functions to place a ceiling on the processor's operational frequency to one of these frequencies in response to an extreme thermal event. In a further embodiment, different frequencies are provided as a function of different ambient temperatures so that an appropriate operational frequency is effectively specified for different thermal ambient excursions.

In an embodiment, the processor manufacturer, in order to provide such operational frequencies, determines a die temperature for each processor at which the specific processor's operation would be guaranteed and determines the maximum permissible power consumption for the specific processor when operating at that maximum permitted temperature. A nominal supply voltage and cooling system is then assumed by the processor manufacturer to translate these parameters into specific processor operational frequencies as a function of specific ambient temperatures. System designers can adjust these operational frequencies and/or temperatures based on their own supply voltages and cooling system technology. For example, a system designer who chooses a cooling system that is more advanced than the assumed one may use a higher operational frequency than the one provided by the processor manufacturer for a particular ambient temperature, or, may identify a higher ambient temperature. With this information, system designers can implement a power management scheme that automatically drops processor operating frequency, e.g., in response to an extreme thermal event, so as to cause the die to operate at its maximum permissible temperature and power consumption so as to keep the die within a guaranteed operational realm.

FIG. 1 shows a process to be performed by processor manufacturer that essentially characterizes 101 each shipped processor with maximum operating frequency information as a function of ambient temperature information where operation of the processor is still guaranteed. In various embodiments such characteristic information is specific to each processor on a processor-by-processor basis.

Such characteristic information may be obtained, for example, by running characterization testing on each manufactured processor. Here, a singular die may be tested before packaging, and/or, a packaged die that forms the completed processor may be characterized. Die temperature may be measured outright (e.g., in the case of an unpackaged die, or, through readouts provided by the (packaged or unpackaged) die of any of its one or more embedded thermal sensors) or calculated (e.g., by measuring case and ambient temperatures of a packaged die and determining die temperature based on the theoretical thermal characteristics of the die's packaging).

A second body of characterization data that effectively maps the die's temperature to its power consumption may also be collected. Here, for example, a number of data points may be collected that, e.g., start at the maximum permissible die temperature and the maximum permissible power consumption for guaranteed operation, and, gradually drop in power consumption and die temperature. Alternatively, a formula can be determined and provided that articulates the drop in die temperature with decreasing power consumption.

A third body of characterization data that effectively maps the die's power consumption to its clock frequency (e.g., at maximum supply voltage and when all logic blocks within the processor die are enabled) across a range of clock frequencies and corresponding die power consumption levels may also be provided. Here, for example, a number of data points may be collected that, e.g., at maximum supply voltage and under a workload that enables all logic blocks within the processor, start at the maximum permissible power consumption and clock frequency and gradually drop the clock frequency and corresponding power consumption. Alternatively, a second formula can be determined and provided that articulates the drop in die power consumption with decreasing clock frequency.

The characterization data is then analyzed in conjunction with an assumed system supply voltage and cooling system external to the die's package to determine specific operational frequencies for the processor as a function of die package ambient temperature. In the alternative, the operational frequencies may be provided in the form of maximum performance states.

The information is then correlated with the specific processor 102. In one embodiment, the frequency and ambient temperature information is embedded in the die of the processor. For example, the data may be written into non-volatile storage circuitry of the die (e.g., fuse storage circuitry embedded on the die where fuses are blown to digitally store the characterization data). Alternatively, the frequency and ambient temperature information may be correlated to the die rather than being embedded within it. For example, the customer of a volume of processors may download or otherwise receive the information for each of the die identified by their respective serial numbers.

The customer/system designer, with knowledge of the system's actual cooling system and theoretical operation thereof is able to determine how well its cooling system can cool the processor die in the face of extreme ambient temperatures relative to the processor manufacturer's assumed cooling system. If the two are substantially similar, the system manufacturer may be able to use the processor manufacturer supplied operational frequencies directly for any particular extreme ambient temperature. Said another way, with the manufacturer having supplied information that describes maximum processor operational frequency as a function of ambient temperature where operation remains guaranteed, the system designer 103 can use the manufacturer provided operational frequencies directly in response to a particular extreme ambient temperature (if the assumed cooling and supply voltages are comparable) or "tweak" them (if the actual system departs from the assumed one).

The system designer/manufacturer configures the system's power management function 104 to reduce the clock frequency of the processor as a function of ambient temperature based on the manufacturer supplied information, where, the reduced clock frequency keeps the operation of the processor in the guaranteed operational realm.

Figure 2:
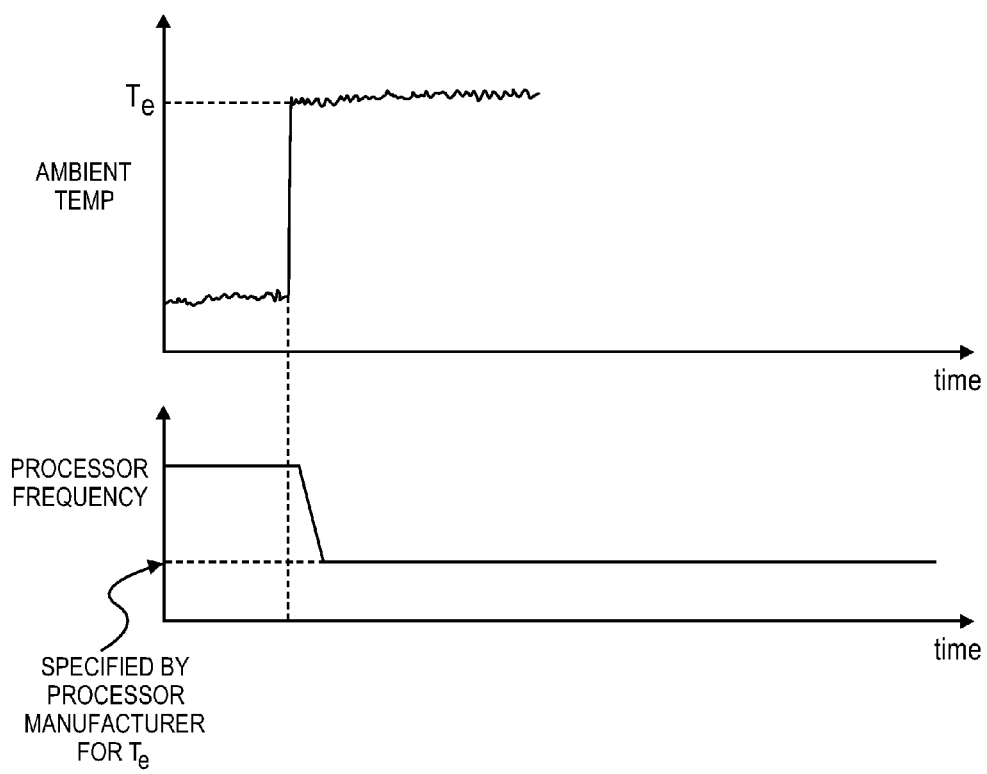
FIG. 2 shows a process for keeping operation of a processor in a guaranteed state.

As such, for example, referring to FIG. 2, if an extreme thermal event is detected 201, the clock frequency of the processor is reduced 202 in response to an operational frequency based on the processor manufacturer supplied one so as to effectively lower the die temperature to keep the processor in an operationally guaranteed state. If the processor manufacturer has specified a time limit for this operational frequency at this particular ambient temperature the system designer can again lower processor frequency if the time limit is approached.

According to one possible implementation, the system designer further resolves the information directly into the processor's power state management tables. The power state management tables can be further resolved to identify a specific power state for the processor for a specific failure event (or lack thereof) and ambient temperature.

Figure 3:
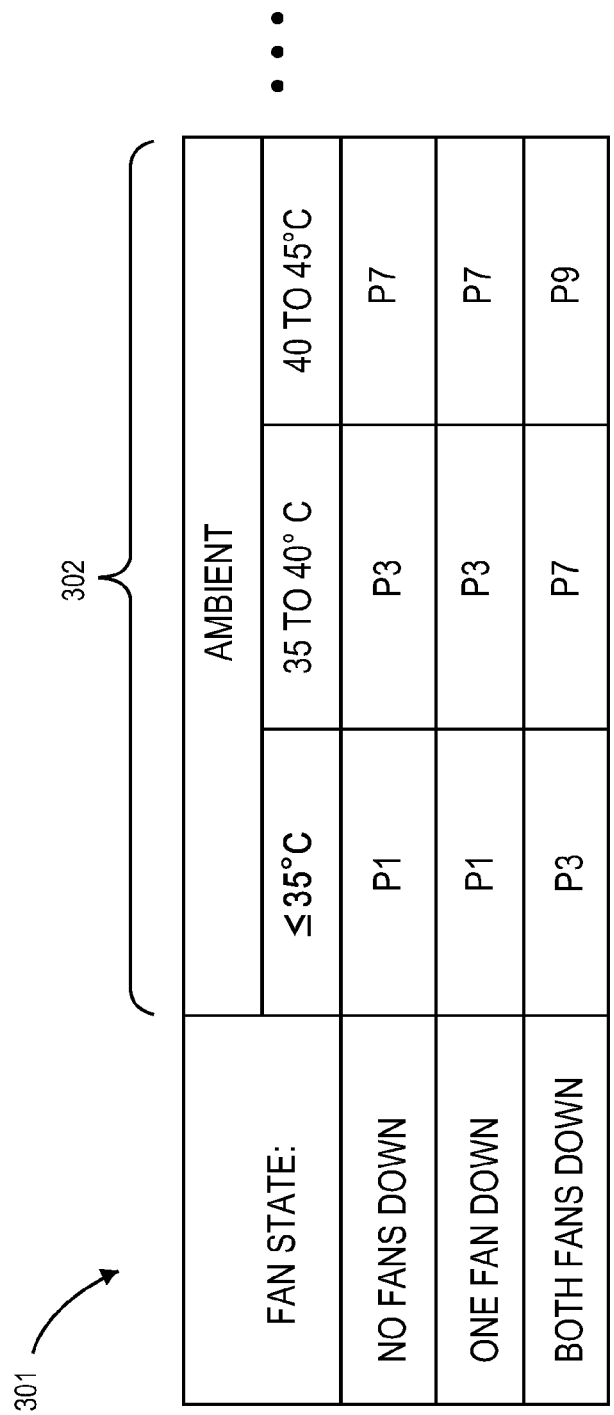
FIG. 3 shows a table that articulates maximum processor performance state to guarantee processor operation as a function of ambient temperature and cooling system state.

FIG. 3 shows an example. As observed in FIG. 3, specific maximum permissible processor performance states to maintain guaranteed operation are articulated for particular states of the cooling system 301 and ambient temperature 302. According to this exemplary illustration, the system designer has determined that, even if the processor operates at the P1 performance state (and its maximum number of logic blocks are enabled and operates at the P1 state's maximum clock frequency), processor operation will still be guaranteed if the ambient temperature is less than or equal to 35° and at least one fan is working. If a second fan fails however, the processor's maximum permissible performance state needs to be dropped to the P3 state.

Likewise, the maximum permissible power state of the processor is lowered further as the ambient temperature increases and then again if one or more fans fail.

Figure 4:
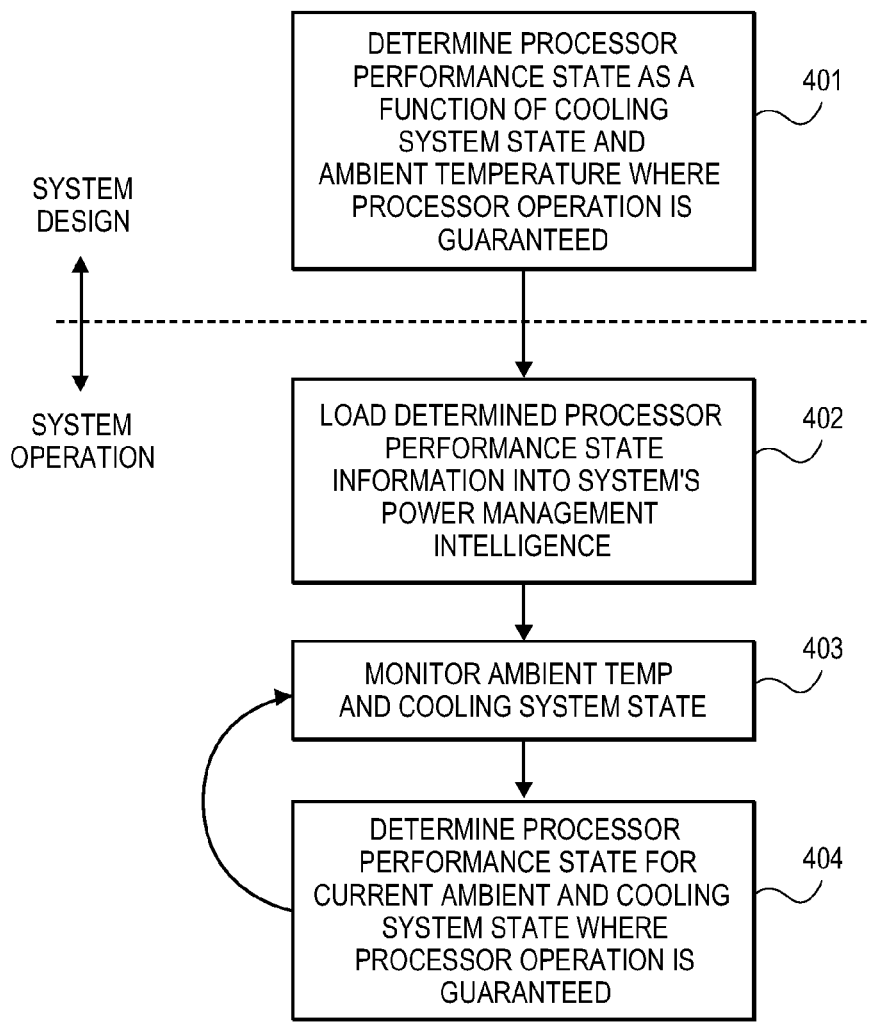
FIG. 4 shows a process that utilizes tabular information such as the tabular information of FIG. 3.

FIG. 4 shows a process for constructing and utilizing a table such as the table observed in FIG. 3. As observed in FIG. 4, entries are determined for a table that outline maximum permissible processor performance state where processor operation is guaranteed as a function of cooling system state and ambient temperature 401. Here, the processor manufacturer supplied information is combined with the designer's knowledge of the cooling system's design and individual processor performance state definitions to articulate the different processor performance states for the different conditions. Thus, the tabular information is determined on a die-by-die basis for the specific system that a die is being integrated into. As such, systems with same model numbers having processors with same model numbers may none the less have different tabular entries owing to the die specific information provided by the processor manufacturer.

Once the entries for the table are determined they are stored, for example, in non volatile memory where the BIOS system firmware of the system is kept. Upon each power up of the system, the table information is loaded 402 into the power management intelligence of the system which may be realized in software, hardware or a combination thereof. As such, the tabular entries may be loaded into register space of the processor or a region of system memory of the system (or even remain in firmware).

During runtime of the system, sensors collect various information that indicate the ambient temperature and the state of the cooling system 403. Based on the current state of the cooling system and ambient temperature, the table information indicates the maximum performance state of the processor where operation of the processor is guaranteed 404. Power management logic is made aware of the maximum performance state under the current conditions and refuses to raise the performance state of the processor beyond the maximum specified by the tabular information (but may lower it depending on other power management protocols).

The collection of information by the sensors 403 is continuous and any change in cooling system state or ambient temperature that corresponds to a change in the applicable table location is identified and any resulting change in maximum permissible processor performance state is communicated to power management logic intelligence. If the performance state of the processor needs to change immediately (e.g., reducing it from its current performance state to a lower performance state), the power management logic intelligence may do so, for example, by writing into register space of the processor (such as model specific register space) to effect the power state change. The information written into the register space may specify the performance state outright, or, corresponding to one or more settings (e.g., clock frequency settings, logic block enable/disable settings) that correspond to the new processor performance state.

If the maximum operating frequency supplied by the processor manufacturer also has an associated time limit (e.g., days, hours), the methodology of FIG. 4 will automatically drop the processor operating frequency (e.g., by lowering to an even lower power state) if the extreme ambient temperature event approaches the time limit.

Figure 5:
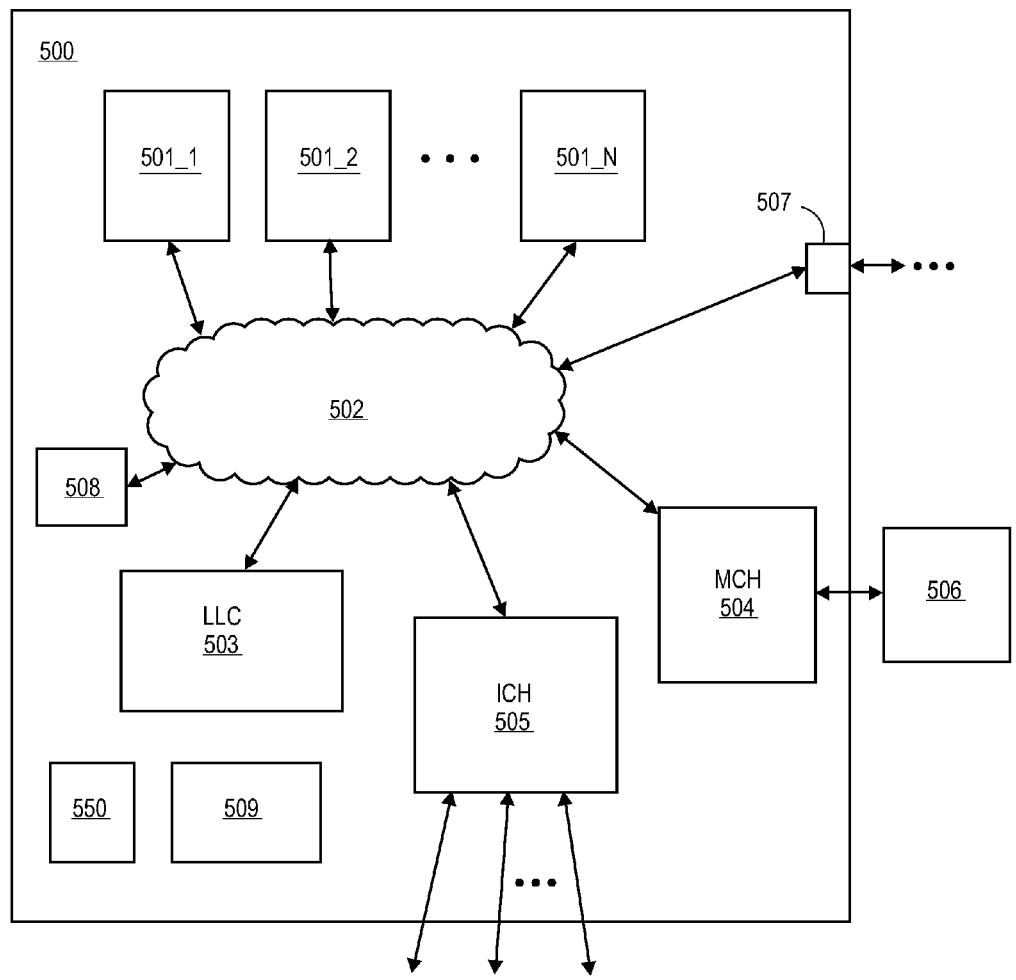
FIG. 5 shows a processor having characterization information embedded therein.

FIG. 5 shows the architecture of an exemplary multi-core processor 500. As observed in FIG. 5, the processor includes: 1) multiple processing cores 501_1 to 501_N; 2) an interconnection network 502; 3) a last level caching system 503; 4) a memory controller 504 and an I/O hub 505. Each of the processing cores contain one or more instruction execution pipelines for executing program code instructions. The interconnect network 502 serves to interconnect each of the cores 501_1 to 501_N to each other as well as the other components 503, 504, 505. The last level caching system 503 serves as a last layer of cache in the processor before instructions and/or data are evicted to system memory 506. The individual cores typically include their own one or more caching levels.

The memory controller 504 reads/writes data and instructions from/to system memory 506. The I/O hub 505 manages communication between the processor and "I/O" devices (e.g., non volatile storage devices and/or network interfaces). Port 507 stems from the interconnection network 502 to link multiple processors so that systems having more than N cores can be realized. Graphics processor 508 performs graphics computations. Power management circuitry 509 manages the performance and power states of the processor as a whole ("package level") as well as aspects of the performance and power states of the individual units within the processor such as the individual cores 501_1 to 501_N, graphics processor 508, etc. Other functional blocks of significance (e.g., phase locked loop (PLL) circuitry) are not depicted in FIG. 5 for convenience.

Notably, the processor of FIG. 5 also has embedded storage circuitry 550 where information pertaining to the processor's maximum operating temperature for a particular extreme ambient temperature where operation of the processor is guaranteed is stored.

As any of the processes taught by the discussion above may be implemented with software such processes may be implemented with program code such as machine-executable instructions that cause a machine that executes these instructions to perform certain functions. Processes taught by the discussion above may also be performed by (in the alternative to the execution of program code or in combination with the execution of program code) by electronic circuitry designed to perform the processes (or a portion thereof).

It is believed that processes taught by the discussion above may also be described in source level program code in various object-orientated or non-object-orientated computer programming languages. An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor comprising:
a non-volatile storage circuitry to store information identifying a maximum operational frequency of said processor at which said processor's operation is guaranteed for an ambient temperature that corresponds to an extreme thermal event and a time limit for guaranteed operation at the maximum operational frequency, wherein the extreme thermal event comprises a failure of one or more fans; and
a power management circuitry to manage performance and power states of the processor by accessing the non-volatile storage circuitry and configuring an operating frequency of the processor to be the maximum operational frequency upon an occurrence of the extreme thermal event for a time period not to exceed the time limit.

2. The processor of claim 1 wherein said maximum operational frequency corresponds to a maximum die temperature of a semiconductor chip housing the processor.

3. The processor of claim 1 wherein said processor's operation is guaranteed for a limited time.

4. The processor of claim 3 wherein said time limit is at least two hours.

5. The processor of claim 1 wherein said non-volatile storage circuitry is also to store nominal maximum ratings and said maximum operational frequency at said ambient temperature to correspond to exceeding said nominal maximum ratings.

6. The processor of claim 1, wherein the non-volatile storage circuitry is to store information for at least three fan states.

7. The processor of claim 1, wherein the configuring is lowering the operating frequency.

8. The processor of claim 7, wherein the power management circuitry is to further lower the operating frequency when the time limit is approached.

9. A method comprising:
obtaining information for a processor that identifies a maximum operating frequency for said processor at an ambient temperature at which said processor's operation is guaranteed and a time limit for guaranteed operation at the maximum operational frequency, said ambient temperature corresponding to an extreme thermal event, wherein the extreme thermal event comprises a failure of one or more fans; and
determining from said information performance states of said processor as a function of ambient temperature and a state of a cooling system where said processor's operation is guaranteed.

10. The method of claim 9 wherein the time limit is at least two hours.

11. The method of claim 9 wherein said information is incorporated into a non-volatile storage of said processor.

12. The method of claim 11 wherein said information is read from said non-volatile storage and loaded into system memory of said processor upon power on of said processor.

13. The method of claim 11 wherein said information is read from said non-volatile storage and loaded into a register space of said processor upon power on of said processor.

14. A method comprising:
determining an ambient temperature of a processor and a state of a cooling system of a processor, said ambient temperature corresponding to an extreme thermal event, wherein the extreme thermal event comprises a failure of one or more fans;
determining a performance state of said processor at which said processor's operation is guaranteed by referring to information that identifies performance states of said processor at which said processor's operation is guaranteed as a function of said processor's ambient temperature and said cooling system's state and a time limit for guaranteed operation at the performance state; and
configuring said processor to be in said performance state.

15. The method of claim 14 wherein said information is within system memory of a computing system that said processor is integrated into, and said configuring is performed by power management intelligence of said computing system.

16. The method of claim 14 wherein the time limit is at least two hours.

17. The method of claim 15 further comprising loading said information into system memory upon power up of said computing system.

18. A non-transitory machine readable storage medium having stored program code that when processing by a computing system causes the computing system to perform a method comprising:
determining an ambient temperature of a processor and a state of a cooling system of a processor, said ambient temperature corresponding to an extreme thermal event, wherein the extreme thermal event comprises a failure of one or more fans;
determining a performance state of said processor at which said processor's operation is guaranteed by referring to information that identifies performance states of said processor at which said processor's operation is guaranteed as a function of said processor's ambient temperature and said cooling system's state and a time limit for guaranteed operation at the performance state; and configuring said processor to be in said performance state.

19. The non-transitory machine readable storage medium of claim 18 wherein said information is within system memory of a computing system that said processor is integrated into, and said configuring is performed by power management intelligence of said computing system.

20. The non-transitory machine readable storage medium of claim 19 wherein the time limit is at least two hours.

21. The non-transitory machine readable storage medium of claim 18 wherein said method further comprises loading said information into system memory of said computing system upon power up of said computing system.

22. The non-transitory machine readable storage medium of claim 18 wherein one of said determined ambient temperature and state of said cooling system is one of a changed ambient temperature and a changed state of said cooling system and said determining a performance state includes identifying a new performance state at which said processor's operation is guaranteed.

* * * * *